(12) United States Patent
Woerner

(10) Patent No.: US 7,371,797 B2
(45) Date of Patent: May 13, 2008

(54) STORAGE-STABLE SILICONE COMPOSITIONS

(75) Inventor: Christof Woerner, Burghausen (DE)

(73) Assignee: Wacker Chemie AG, Munich (DE)

( * ) Notice: Subject to any disclaimer, the term of this patent is extended or adjusted under 35 U.S.C. 154(b) by 346 days.

(21) Appl. No.: 10/877,135

(22) Filed: Jun. 25, 2004

(65) Prior Publication Data

US 2005/0037943 A1    Feb. 17, 2005

(30) Foreign Application Priority Data

Jul. 4, 2003   (DE) ............................... 103 30 267
Nov. 13, 2003  (DE) ............................... 103 53 062

(51) Int. Cl.
     *C08L 83/04*    (2006.01)
(52) U.S. Cl. .................. 524/588; 524/492; 524/493; 525/477; 525/478
(58) Field of Classification Search .................. None
     See application file for complete search history.

(56) References Cited

U.S. PATENT DOCUMENTS

| | | | |
|---|---|---|---|
| 3,839,388 A | | 10/1974 | Nitzsche et al. |
| 3,996,188 A | * | 12/1976 | Laur ........................... 524/403 |
| 4,008,198 A | * | 2/1977 | Krohberger et al. ........ 524/864 |
| 4,013,611 A | | 3/1977 | Hechtl et al. |
| 4,104,351 A | * | 8/1978 | Blizzard et al. ............ 264/236 |
| 4,725,643 A | | 2/1988 | Burkhardt |
| 4,835,237 A | | 5/1989 | Burkhardt et al. |
| 4,975,510 A | | 12/1990 | Wegehaupt et al. |
| 5,198,171 A | * | 3/1993 | Kasahara et al. ....... 264/211.23 |
| 5,408,025 A | | 4/1995 | Thompson et al. |
| 5,457,220 A | | 10/1995 | Razzano |
| 5,534,608 A | * | 7/1996 | Thompson et al. ........... 528/12 |
| 2003/0114571 A1 | * | 6/2003 | Pan ........................... 524/492 |

FOREIGN PATENT DOCUMENTS

| | | |
|---|---|---|
| DE | 3 839 900 | 5/1990 |
| EP | 0 285 091 | 10/1988 |
| EP | 0 319 977 | 6/1989 |
| EP | 0 208 285 | 4/1993 |
| EP | 0 798 342 | 10/1997 |
| EP | 0 994 159 | 4/2000 |
| EP | 1 077 226 | 2/2001 |
| JP | 2002-338812 A * | 11/2000 |

OTHER PUBLICATIONS

Abstract for the article entitled "The Influence of Filler Morphology and Surface Hydroxyls on Crepe-Hardening of Uncured Silicone Elastomers" authored by Osaheni et al., and published in Macromolecular Symposia, 2001, 169(1), 261-268.*
English Derwent Abstract AN 1990-172169[23] corresp. to DE 3 839 900, May 1990.
English Abstract corresponding to EP 1 077 226 A1, Feb. 2001.
English Derwent Abstract AN 2000-319924[28] corresp. to EP 0 994 159 A1, Apr. 2000.

* cited by examiner

*Primary Examiner*—Marc S. Zimmer
(74) *Attorney, Agent, or Firm*—Brooks Kushman P.C.

(57) ABSTRACT

Silicone compositions containing:
(A) 100 parts by weight of organopolysiloxane(s) having an OH content, based on Si-bonded OH groups, of 1 to 100 weight ppm; and
(B) 1-200 parts by weight of filler(s) having a specific surface area of at least 50 $m^2/g$,
exhibit surprising stability and are useful for preparing numerous compositions where a stable viscosity is desirable.

14 Claims, No Drawings

STORAGE-STABLE SILICONE COMPOSITIONS

BACKGROUND OF THE INVENTION

1. Field of the Invention

The invention relates to storage-stable silicone compositions and a process for their preparation.

2. Background Art

Silicone elastomers are well known products, and are generally prepared by the chain extension and/or crosslinking of reactive organopolysiloxane oligomers or polymers with or without low molecular weight crosslinkers. In many instances, it is desirable to provide a curable mixture or component thereof in viscous liquid or paste form. It is desirable that the consistency of such mixtures or components does not change during storage. As is known, the mechanical properties of silicone elastomers can be improved by addition of reinforcing fillers, such as e.g. silica or carbon black. Such additives have also been found to increase storage stability.

DE-3839900, for example, describes the use of prehydrophobized silica in silicone compositions. In contrast, EP 798342 describes the preparation of silicone compositions wherein hydrophilic silica is hydrophobized with silazanes in the presence of polysiloxanes and water. In both variants, the hydrophobization of silica improves the storage stability of the non-crosslinked silicone compositions. However, the storage stability is still inadequate.

SUMMARY OF THE INVENTION

It would be desirable to improve the storage stability of silicone compositions containing reinforcing fillers. This and other objects are surprisingly achieved through the use of reinforcing fillers of high surface area with silicones having very little but finite residual hydroxyl group content.

DETAILED DESCRIPTION OF THE PREFERRED EMBODIMENT(S)

The invention thus relates to storage-stable silicone compositions comprising:
  (A) 100 parts by weight of polyorganosiloxane(s) having an OH content, based on Si-bonded OH groups, of 1 to 100 ppm.
  (B) 1-200 parts by weight of filler(s) having a specific surface area of at least 50 m²/g.

It has surprisingly, been found, that in addition to the hydrophobization of silica, a low Si-bonded OH content of the polyorganosiloxanes employed plays a decisive role in determining storage stability.

The organosiloxane (A) can be any desired polyorganosiloxane having an OH content, based on Si-bonded OH groups, of 1 to 100 ppm by weight, preferably 2-80 ppm by weight, more preferably 3-50 ppm by weight. Mixtures of various polyorganosiloxanes can also be employed. The OH groups can be bonded to the following structural units:

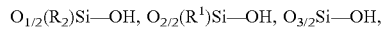

where the radical(s) R preferably correspond to the radicals R¹, R² defined hereafter, and H. Methyl, vinyl, phenyl, 1,1,1-trifluoropropyl, and H are particularly preferred.

(A-C) is a preferred variant of (A), but on average at least one radical having an aliphatic carbon-carbon multiple bond must be present per molecule, alkenyl groups having 2 to 6 carbon atoms, such as vinyl, allyl, methallyl, 1-propenyl, 5-hexenyl, ethynyl, butadienyl, hexadienyl, cyclopentenyl, cyclopentadienyl, or cyclohexenyl, preferably vinyl and allyl, with terminal vinyl functionality being preferred. Preparation of vinyl-terminated polyorganosiloxanes generally results in some polyorganosiloxanes having but one or no vinyl groups, with corresponding residual Si—OH groups. Vinyl-terminated, linear organopolysiloxanes having a low content of organopolysiloxanes with a single aliphatically unsaturated carbon-carbon multiple bond and a low content of organopolysiloxanes with no aliphatically unsaturated carbon-carbon multiple bonds are particularly preferred.

(A-D) is a preferred variant of (A), but on average at least one Si-bonded hydrogen atom must be present per molecule. Linear organopolysiloxanes having on average at least one Si-bonded hydrogen atom in the chain are preferred. SiH-terminated, linear organopolysiloxanes having a low content of organopolysiloxanes with only one Si-bonded hydrogen atom and a low content of organopolysiloxanes with no Si-bonded hydrogen atom are also preferred.

(A-E) is a preferred variant of (A), but on average at least one radical having an aliphatic carbon-carbon multiple bond must be present per molecule and on average at least one Si-bonded hydrogen atom must also be present per molecule.

The composition of the polyorganosiloxanes (A) having an OH content of 1-100 ppm by weight, based on Si-bonded OH groups, preferably corresponds to the average general formula (1) (the OH groups have not been shown in formula (1) due to the low content)

in which
R¹ denotes a monovalent, optionally halogen-substituted or cyano-substituted $C_1$-$C_{10}$ hydrocarbon radical which is optionally bonded to silicon via an organic divalent group and contains aliphatic carbon-carbon multiple bonds,
R² denotes a monovalent, optionally halogen-substituted or cyano-substituted $C_1$-$C_{10}$ hydrocarbon radical which is bonded via SiC and is free from aliphatic carbon-carbon multiple bonds,
x denotes a non-negative number such that two radicals R¹ are present in each molecule in at least 50% of all the polyorganosiloxane molecules, and
y denotes a non-negative number such that (x+y) is in the range from 1.8 to 2.5.

The alkenyl groups R¹ may participate in an addition reaction with an SiH-functional crosslinking agent. Alkenyl groups having 2 to 6 carbon atoms, such as vinyl, allyl, methallyl, 1-propenyl, 5-hexenyl, ethynyl, butadienyl, hexadienyl, cyclopentenyl, cyclopentadienyl and cyclohexenyl, preferably vinyl and allyl, are conventionally used. The radicals R¹ can be bonded in any position of the polymer chain, in particular to the terminal silicon atoms.

Examples of unsubstituted radicals R² are alkyl radicals such as the methyl, ethyl, n-propyl, iso-propyl, n-butyl, iso-butyl, tert-butyl, n-pentyl, iso-pentyl, neo-pentyl and tert-pentyl radicals, hexyl radicals such as the n-hexyl radical, heptyl radicals such as the n-heptyl radical, octyl radicals such as the n-octyl radical and iso-octyl radicals such as the 2,2,4-trimethylpentyl radical, nonyl radicals such as the n-nonyl radical, and decyl radicals such as the n-decyl radicals; alkenyl radicals such as the vinyl, allyl, n-5-hexenyl, 4-vinylcyclohexyl and the 3-norbornenyl radicals; cycloalkyl radicals such as the cyclopentyl, cyclohexyl, 4-ethylcyclohexyl and cycloheptyl radicals, norbornyl radicals and methylcyclohexyl radicals; aryl radicals, such as the phenyl, biphenylyl and naphthyl radicals; alkaryl radicals, such as the o-, m- and p-tolyl and ethylphenyl radicals; and aralkyl radicals, such as the benzyl and the α- and β-phenylethyl radicals.

Examples of substituted hydrocarbon radicals as radicals $R^2$ are halogenated hydrocarbons, such as the chloromethyl, 3-chloropropyl, 3-bromopropyl, 3,3,3-trifluoropropyl and 5,5,5,4,4,3,3-hexafluoropentyl radical, as well as the chlorophenyl, dichlorophenyl and trifluorotolyl radicals. $R^2$ preferably contains 1 to 6 carbon atoms. Methyl, 3,3,3-trifluoropropyl and phenyl radicals are particularly preferred.

The structure of the polyorganosiloxanes (A) containing alkenyl groups can be linear, cyclic, or branched. The content of tri- and/or tetrafunctional units leading to branched polyorganosiloxanes is typically very low, preferably not more than 20 mol %, in particular not more than 0.1 mol %.

The use of linear polydimethylsiloxanes containing vinyl groups and preferably having a viscosity of 0.2-5,000 Pas, in particular 1-2,000 Pas at 25° C. is particularly preferred.

Reinforcing fillers (B) are, preferably precipitated or pyrogenic silicas, and also carbon black. Precipitated and pyrogenic silicas, as well as mixtures thereof, are preferred. Silicas surface-treated with a ("a" means "one or more") silylating agent are particularly preferred. The hydrophobization of the silicas can be carried out either before the incorporation into the polyorganosiloxane or also in the presence of a polyorganosiloxane by the in situ process. Both processes can be carried out either in a batch process or continuously. All the hydrophobizing agents known to one skilled in the art can be used as silylating agents. These are preferably silazanes, in particular hexamethyldisilazane and/or 1,3-divinyl-1,1,3,3-tetramethyldisilazane, and/or polysilazanes, it also being possible for water additionally to be employed. SiOH— and/or SiCl— and/or alkoxy-functional silanes or siloxanes can also be used as hydrophobizing agents. Cyclic, linear or branched non-functional organosiloxanes, such as e.g. octamethylcyclotetrasiloxane or polydimethylsiloxane, can likewise be employed as silylating agents. To accelerate the hydrophobization, the addition of catalytically active additives, such as ammonia, ammonium salts, hydroxides, phosphonium hydroxides, silanolates or siloxanolates, is also possible. The hydrophobizing can be carried out in one step using one or more hydrophobizing agents, but also in several steps using one or more hydrophobizing agents. A silica having a BET specific surface area of 80-400 m²/g, more preferably 100-400 m²/g, is preferred.

(F) All known catalysts which catalyze the hydrosilylation reactions which proceed during crosslinking of addition-crosslinking silicone compositions can be employed as the hydrosilylation catalyst. Metals and compounds thereof, such as platinum, rhodium, palladium, ruthenium and iridium, preferably platinum, can be employed in particular as hydrosilylation catalysts. Platinum and platinum compounds are preferably used. Those platinum compounds which are soluble in polyorganosiloxanes are particularly preferred. The platinum-olefin complexes of the formulae $(PtCl_2.olefin)_2$ and $H(PtCl_3.olefin)$, for example, can be used as soluble platinum compounds, alkenes having 2 to 8 carbon atoms such as ethylene, propylene and isomers of butene and octene, or cycloalkenes having 5 to 7 carbon atoms such as cyclopentene, cyclohexene and cycloheptene, preferably being employed. Further soluble platinum catalysts are the platinum-cyclopropane complex of the formula $(PtCl_2C_3H_6)_2$, the reaction products of hexachloroplatinic acid with alcohols, ethers and aldehydes or mixtures thereof or the reaction product of hexachloroplatinic acid with methylvinylcyclotetrasiloxane in the presence of sodium bicarbonate in ethanolic solution. Complexes of platinum with vinylsiloxanes, such as sym-divinyltetramethyldisiloxane, are particularly preferred. The platinum compounds described in EP-A-1077226 and EP-A-994159 are likewise very suitable.

The hydrosilylation catalyst can be employed in any desired form, for example also in the form of microcapsules containing the hydrosilylation catalyst, or organopolysiloxane particles, as described in EP-A-1006147. The content of hydrosilylation catalysts is chosen such that the addition-crosslinkable silicone composition has a Pt content of 0.1-200 ppm by weight, preferably 0.5-40 ppm by weight.

(H) SiH crosslinking agent, which has on average at least two SiH functions per molecule, preferably possesses units of the formula (2)

in which
$R^3$ corresponds to $R^2$
with the proviso that
b is 0, 1, 2 or 3 and a is 0, 1 or 2, and that on average at least two silicon-bonded hydrogen atoms are present per molecule.

The use of an organosilicon compound containing on average three or more SiH groups per molecule is preferred. The hydrogen content of the organosilicon compound, based exclusively on the hydrogen atoms bonded directly to silicon atoms, is preferably in the range from 0.002 to 1.7 wt % of hydrogen, preferably 0.1 to 1.7 wt % of hydrogen.

The organosilicon compound preferably contains at least three and not more than 600 silicon atoms per molecule. The use of an organosilicon compound which contains 4 to 200 silicon atoms per molecule is preferred, and the structure can be linear, branched, cyclic, or network-like.

Particularly preferred organosilicon compounds are linear polyorganosiloxanes of the general formula (3)

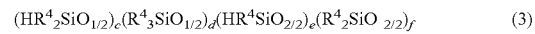

wherein
$R^4$ has the meanings of $R^3$ and
the non-negative integers c, d, e and f fulfill the following relationships: (c+d)=2, (c+e)>2, 5<(e+f)<200 and 0.1<e/(e+f)<1.

The SiH-functional organosilicon compound is preferably contained in the crosslinkable silicone composition in an amount such that the molar ratio of SiH groups to alkenyl groups is 0.2 to 5, in particular 1.0 to 3.0.

(L) Peroxide

Examples of organic peroxides are acyl peroxides such as dibenzoyl peroxide, bis(4-chlorobenzoyl) peroxide, bis(2,4-dichlorobenzoyl) peroxide and bis(4-methylbenzoyl) peroxide; alkyl peroxides and aryl peroxides, such as di-tert-butyl peroxide, 2,5-bis-(tert-butylperoxy)-2,5-dimethylhexane, dicumyl peroxide and 1,3-bis-(tert-butylperoxy-isopropyl)-benzene; perketals, such as 1,1-bis-(tert-butylperoxy)-3,3,5-trimethylcyclohexane; peresters, such as diacetyl peroxydicarbonate, tert-butyl perbenzoate, tert-butylperoxy-isopropyl carbonate, tert-butyl peroxy-isononanoate, dicyclohexyl peroxydicarbonate and 2,5-dimethylhexane 2,5-diperbenzoate, and tert-butyl-β-hydroxyethyl peroxide. A combination of organic peroxides can also be employed, such as bis-4-methylbenzoyl peroxide and a single compound or at least two of the compounds from the group consisting of benzoyl peroxide, dicumyl peroxide, 2,5-dimethylhexane 2,5-di-perbenzoate and di-tert-butyl peroxide. The silicone compositions preferably comprise 0.05 to 10 wt %, in particular 0.1 to 2 wt % of organic peroxide.

Possible Further Constituents (M):

The silicone compositions can optionally comprise further additives up to a content of up to 70 wt %, preferably 0.0001 to 40 wt %. These additives can be e.g. resinous polyorganosiloxanes which differ from the diorganopolysiloxanes, dispersing auxiliaries, solvents, adhesion promoters, pigments, dyestuffs, plasticizers, organic polymers, heat stabilizers, etc. These include additives such as dyestuffs, pigments etc. The compositions can moreover comprise thixotropy-enhancing additives as constituents, such as highly disperse silica or other commercially available thixotropy additives.

Siloxanes of the formula $HSiR^5_2\text{-}[O\text{---}SiR^5_2]_w\text{---}H$, wherein w denotes values from 1 to 1000 and $R^5$ is the same as $R^2$, can also additionally be present as chain extenders.

The compositions can moreover comprise additives which serve for targeted adjustment of the processing time, start-up temperature and rate of crosslinking of the crosslinking compositions. These inhibitors and stabilizers are very well-known in the field of crosslinking compositions.

Additives which improve the compression set can also additionally be added, as well as hollow bodies, for example so-called microballoons, and blowing agents for producing foams.

The compounding of the silicone compositions is carried out by mixing organopolysiloxane (A) having an OH content based on Si-bonded OH groups of 1 to 100 ppm by weight of (A) with filler (B).

The crosslinking of the crosslinkable silicone compositions comprising organopolysiloxane (A-C) and filler (B) is preferably carried out, after addition of SiH crosslinking agent (H) and hydrosilylation catalyst (F) or peroxide (L), preferably by heating.

The crosslinking of the crosslinkable silicone compositions comprising organopolysiloxane (A-D) which additionally contains, per molecule, on average more than one radical having an aliphatic carbon-carbon multiple bond and filler (B), and the crosslinking of the crosslinkable silicone compositions comprising organopolysiloxane (A-E) and filler (B) are also preferably carried out, after addition of hydrosilylation catalyst (F), by heating. The crosslinking is preferably carried out at 30 to 250° C., preferably at not less than 50° C., in particular at not less than 100° C., and most preferably at 150-200° C.

The inventive compositions are preferably used as pastes, and are particularly suitable for the preparation of storage-stable RTV-2 and LSR compositions, preferably one component comprising the hydrosilylation catalyst (F) in addition to (A) and (B) and the second component comprising the SiH crosslinking agent (H) in addition to (A) and (B).

The invention also relates to a preferred process for the preparation of preferably linear organopolysiloxanes having triorganosiloxy groups as terminal units from a linear organopolysiloxane containing Si-bonded hydroxyl groups in the terminal positions and a silicon compound having two triorganosilyl groups and/or two hydridodiorganosilyl groups per molecule, phosphonitrile chloride being used as the catalyst. The process comprises reacting a linear organopolysiloxane containing terminal Si-bonded hydroxyl groups, after it has reached the desired average viscosity by condensation in the presence of phosphonitrile chloride and still contains phosphonitrile chloride, with a hexaorganodisilazane in amounts of 0.05 to 1 percent by weight, also based on the weight of the organopolysiloxane employed, at 155-200° C. The process preferably takes place in the absence of amounts of fillers having a BET surface area of at least 50 m²/g, which exceed 1 percent by weight, based on the weight of the particular amount of organopolysiloxane employed.

Any desired linear organopolysiloxanes containing Si-bonded hydroxyl groups in the terminal units, the viscosity of which it is possible to increase by condensation in the presence of phosphonitrile chloride as a catalyst, can be employed in the process. Examples of such organopolysiloxanes are, in particular, those of the formula $$HO(SiR^6_2O)_mH.$$

In this formula, $R^6$ corresponds to the radicals $R^1$, $R^2$ and H. Preferably, m has a value such that the average viscosity of the organopolysiloxane, before it is mixed with phosphonitrile chloride, is not more than 500 mm².s⁻¹ at 25° C. Although not shown by the above formula, which is often used, units of the formula $SiR^6_2O$ can be replaced by others, such as those of the formula $R^6SiO_{3/2}$, $R_3^6SiO_{1/2}$ or $SiO_{4/2}$, and this is true in the claims as well. However, the process is of the greatest importance for diorganopolysiloxanes containing Si-bonded hydroxyl group in the terminal units, wherein all the organic radicals are methyl groups.

The phosphonitrile chlorides can be any desired phosphonitrile chlorides which promote the condensation of linear organopolysiloxanes containing Si-bonded hydroxyl groups in the terminal units. They can be e.g. those which have been prepared by reaction of 400 parts by weight of phosphorus pentachloride with 130 parts by weight of ammonium chloride (cf. e.g. "Berichte der Deutschen Chemischen Gesellschaft [Reports of the German Chemical Society]", volume 57 1924, page 1345) or those which are obtained by reaction of 2 mol of phosphorus pentachloride with 1 mol of ammonium chloride (cf. e.g. U.S. Pat. No. 3,839,388, published Oct. 1, 1974, S. Nietzsche et al., Wacker-Chemie GmbH). Mixtures of at least two different types of phosphonitrile chlorides can of course also be used.

Phosphonitrile chloride is preferably used in amounts of 1 to 300 ppm by weight, in particular 5 to 100 ppm by weight, based on the weight of the amount of linear organopolysiloxane containing terminal Si-bonded hydroxyl groups employed.

The condensation of the hydroxyl-terminated linear organopolysiloxane is preferably carried out at 155 to 200° C., more preferably 155-190° C., and most preferably 160 to 180° C. To facilitate removal of the water formed during the condensation, the condensation is preferably carried out at a pressure below 800 hPa (abs.). However, this condensation can also be carried out at higher pressures.

The hexaorganodisilazane employed in the process of the invention is preferably one of the formula $$[R^7Si]_2NH$$

wherein $R^7$ denotes identical or different, monovalent, optionally halogenated hydrocarbon radicals. Preferably, the radicals $R^7$ also contain not more than 1 to 10 carbon atom(s) per radical. 1,3-Divinyl-1,1,3,3-tetramethyldisilazane is particularly preferred as the hexaorganodisilazane. Hexamethyldisilazane is also an important hexaorganodisilazane which can be employed in the inventive process.

Preferably, the hexaorganodisilazane is used in amounts of 0.1 to 1.0 percent by weight, based on the weight of the particular amount of diorganopolysiloxane employed, it being advantageous to use an amount of 0.3-1.0 percent by weight to control the OH content, the amount depending, however, on the nature of the compounds employed, i.e. on how high their molecular weight is, and on their overall composition.

The reaction of the hexaorganodisilazane with the linear organopolysiloxane containing hydroxyl groups in the terminal units takes place during or after mixing of the two abovementioned reaction participants with one another. The ammonia formed during the reaction of Si-bonded hydroxyl groups with the hexaorganodisilazane to give triorganosiloxy groups renders the catalyst inactive.

The process according to the invention can be carried out batchwise or continuously. It is preferably carried out continuously. Preferably, the hexaorganodisilazane is added to the linear organopolysiloxane containing Si-bonded hydroxyl groups after the latter has reached the desired average viscosity, and following removal of the organopolysiloxane from the vessel in which the condensation has taken place.

The reaction time is preferably 10 minutes to 48 hours, more preferably 15 min to 24 hours, and most preferably 20 minutes to 20 hours. The OH content can be controlled via the reaction time, the reaction time depending, however, on the nature of the compounds employed, i.e. on how high their molecular weight is and on their composition.

The linear organopolysiloxane products having triorganosiloxy groups as terminal units can be used for all purposes for which such linear organopolysiloxanes are useful, e.g. as thread lubricants and for the preparation of organopolysiloxane elastomers.

The phosphonitrile chloride used in the following examples was prepared as follows: A mixture of 417 g (2 mol) phosphorus pentachloride and 53.5 g (1 mol) ammonium chloride in 1000 ml tetrachloroethane is heated at the boiling point under reflux for 12 hours. From the pale yellow solution obtained in this way, the volatile contents are removed at 160° C. and with reducing the pressure to about 1.33 hPa (abs.). Yellowish crystals remain as the residue, these substantially comprising the compound of the formula $$Cl_3PNPCl_2PCl_3 \cdot PCl_6$$

The invention is based on the surprising discovery that by using polyorganosiloxanes having an OH content of 1 to 100 weight ppm, based on Si-bonded OH groups, particularly storage-stable silicone compositions which comprise reinforcing fillers can be prepared. This means that by using these polyorganosiloxanes, an increase in the viscosity can be prevented for several months or at least significantly reduced. The increase in viscosity is reduced both at conventional storage temperatures of up to 35° C. and at higher temperatures.

EXAMPLES

Comparative Example C1 (Not According to the Invention)

156 g of a trimethylsiloxy-terminated polydimethylsiloxane having a viscosity of 20,000 mPa·s (25° C.) were initially introduced into a laboratory kneader and heated up to 150° C., and 110 g of a hydrophobic pyrogenic silica having a BET specific surface area of 300 m²/g and a carbon content of 4.2 wt % were added. This highly viscous composition was then diluted with 141 g of the abovementioned polydimethylsiloxane. Volatile constituents were removed over the course of one hour by kneading under vacuum (10 mbar) at 150° C. The trimethylsiloxy-terminated polydimethylsiloxane employed had a high content of residual hydroxydimethylsiloxy end groups. The OH content was 200 weight ppm, based on the polydimethylsiloxane used.

Example 2

In contrast to Comparative Example C1, a trimethylsiloxy-terminated polydimethylsiloxane having an OH content of 60 weight ppm was employed.

Example 3

In contrast to Comparative Example C1, a trimethylsiloxy-terminated polydimethylsiloxane having an OH content of 5 weight ppm was employed.

Comparative Example C4 (Not According to the Invention)

In contrast to Comparative Example C1, a trimethylsiloxy-terminated polydimethylsiloxane having an OH content of only 0.5 weight ppm was employed.

TABLE 1

Influence of the OH content on the storage stability at 25 and 50° C.

|  | OH content of the trimethylsiloxy-terminated polydimethylsiloxane [weight ppm] | Initial viscosity of the silicone composition [Pa · s] | Viscosity of the silicone composition after 4 weeks at 25° C. [Pa · s] | Viscosity of the silicone composition after 4 weeks at 50° C. [Pa · s] |
| --- | --- | --- | --- | --- |
| Comp. Example C1 | 200 | 810 | 1320 | 1560 |
| Example 2 | 60 | 790 | 850 | 940 |
| Example 3 | 5 | 780 | 790 | 820 |
| Comp. Example C4 | 0.5 | 790 | 870 | 990 |

It can be seen from table 1 that an OH content of 1-100 weight ppm results in a considerable improvement in the storage stability when prehydrophobized silica is employed.

Comparative Example C5 (Not According to the Invention)

156 g of a vinyldimethylsiloxy-terminated polydimethylsiloxane having a viscosity of 20,000 mPa·s (25° C.) were initially introduced into a laboratory kneader and heated up to 150° C., and 110 g of a hydrophobic pyrogenic silica having a BET specific surface area of 300 m$^2$/g and a carbon content of 4.2 wt % were added. This highly viscous composition was then diluted with 141 g of the abovementioned vinyldimethylsiloxy-terminated polydimethylsiloxane. Volatile constituents were removed in the course of one hour by kneading under vacuum (10 mbar) at 150° C. The vinyldimethylsiloxy-terminated polydimethylsiloxane employed had a high content of residual hydroxydimethylsiloxy end groups. The OH content was 180 weight ppm, based on the polydimethylsiloxane used.

Example 6

In contrast to Comparative Example C5, a vinyldimethylsiloxy-terminated polydimethylsiloxane having an OH content of 50 weight ppm was employed.

Example 7

In contrast to Comparative Example C5, a vinyldimethylsiloxy-terminated polydimethylsiloxane having an OH content of 5 weight ppm was employed.

Comparative Example C8 (Not According to the Invention)

In contrast to Comparative Example C5, a vinyldimethylsiloxy-terminated polydimethylsiloxane having an OH content of only 0.4 weight ppm was employed.

It can be seen from Table 2 that an OH content of 1-100 weight ppm results in a considerable improvement in the storage stability when prehydrophobized silica is employed.

Example 9 (Not According to the Invention)

156 g of a vinyldimethylsiloxy-terminated polydimethylsiloxane having a viscosity of 20,000 mPa·s (25° C.) were initially introduced into a kneader and mixed with 27 g of hexamethyldisilazane and 9.3 g of water, and the mixture was then mixed with 100 g of pyrogenic silica having a BET surface area of 300 m$^2$/g, heated to 100° C. and then kneaded for 1 h. Thereafter, volatile constituents were removed in vacuo at 150° C. and the product was diluted with 141 g of vinyldimethylsiloxy-terminated polydimethylsiloxane having a viscosity of 20,000 mPa·s. The vinyldimethylsiloxy-terminated polydimethylsiloxane employed had a high content of residual hydroxydimethylsiloxy end groups. The OH content was 180 weight ppm, based on the polydimethylsiloxane used.

Example 10

In contrast to Comparative Example C9, a vinyldimethylsiloxy-terminated polydimethylsiloxane having an OH content of 50 weight ppm was employed.

Example 11

In contrast to Comparative Example C9, a vinyldimethylsiloxy-terminated polydimethylsiloxane having an OH content of 5 weight ppm was employed.

Comparative Example C12 (Not According to the Invention)

In contrast to Comparative Example C9, a vinyldimethylsiloxy-terminated polydimethylsiloxane having an OH content of only 0.4 weight ppm was employed.

TABLE 2

Influence of the OH content on the storage stability at 25 and 50° C.

|  | OH content of the vinyldimethyl siloxy- terminated polydimethyl siloxane [weight ppm] | Initial viscosity of the silicone composition [Pa · s] | Viscosity of the silicone composition after 4 weeks at 25° C. [Pa · s] | Viscosity of the silicone composition after 6 months at 25° C. [Pa · s] | Viscosity of the silicone composition after 4 weeks at 50° C. [Pa · s] |
|---|---|---|---|---|---|
| Comp. Example C5 | 180 | 930 | 1520 | 1900 | 1630 |
| Example 6 | 50 | 820 | 890 | 1010 | 1090 |
| Example 7 | 5 | 820 | 780 | 920 | 850 |
| Comp. Example C8 | 0.4 | 840 | 910 | 1080 | 1120 |

TABLE 3

Influence of the OH content on the storage stability at 25 and 50° C.

| | OH content of the vinyldimethylsiloxy-terminated polydimethylsiloxane [weight ppm] | Initial viscosity of the silicone composition [Pa · s] | Viscosity of the silicone composition after 4 weeks at 25° C. [Pa · s] | Viscosity of the silicone composition after 4 weeks at 50° C. [Pa · s] |
|---|---|---|---|---|
| Comp. Example C9 | 180 | 780 | 1200 | 1290 |
| Example 10 | 50 | 700 | 770 | 850 |
| Example 11 | 5 | 720 | 740 | 770 |
| Comp. Example C12 | 0.4 | 740 | 850 | 910 |

It can be seen from table 3 that an OH content of 1-100 weight ppm results in a considerable improvement in the storage stability of silicone compositions also in the case of in situ hydrophobization of the silica in the presence of the polydimethylsiloxane.

Comparative Example C13 (Not According to the Invention)

156 g of a vinyldimethylsiloxy-terminated polydimethylsiloxane having a viscosity of 1,000,000 mPa·s (25° C.) were initially introduced into a laboratory kneader and heated up to 150° C., and 50 g of a hydrophobic pyrogenic silica having a BET specific surface area of 300 m²/g and a carbon content of 4.2 wt % were added. This highly viscous composition was then diluted with 141 g of the abovementioned vinyldimethylsiloxy-terminated polydimethylsiloxane. Volatile constituents were removed in the course of one hour by kneading under vacuum (10 mbar) at 150° C. The vinyldimethylsiloxy-terminated polydimethylsiloxane employed had a high content of residual hydroxydimethylsiloxy end groups. The OH content was 170 weight ppm, based on the polydimethylsiloxane used.

Example 14

In contrast to Comparative Example C13, a vinyldimethylsiloxy-terminated polydimethylsiloxane having an OH content of 40 weight ppm was employed.

Example 15

In contrast to Comparative Example C13, a vinyldimethylsiloxy-terminated polydimethylsiloxane having an OH content of 5 weight ppm was employed.

Comparative Example C16 (Not According to the Invention)

In contrast to Comparative Example C13, a vinyldimethylsiloxy-terminated polydimethylsiloxane having an OH content of only 0.6 weight ppm was employed.

TABLE 4

Influence of the OH content on the storage stability at 25 and 50° C.

| | OH content of the vinyldimethylsiloxy-terminated polydimethylsiloxane [weight ppm] | Initial viscosity of the silicone composition [Pa · s] | Viscosity of the silicone composition after 4 weeks at 25° C. [Pa · s] | Viscosity of the silicone composition after 4 weeks at 50° C. [Pa · s] |
|---|---|---|---|---|
| Comp. Example 13 | 170 | 3500 | 8700 | 9800 |
| Example 14 | 40 | 3300 | 3600 | 3900 |
| Example 15 | 5 | 3200 | 3300 | 3350 |
| Comp. Example 16 | 0.6 | 3300 | 3700 | 4200 |

It can be seen from table 4 that an OH content of 1-100 weight ppm considerably improves the storage stability.

Example 17

550 g of the silicone composition described in example 6 were mixed with 0.40 g of ethynylcyclohexanol, 12.7 g of a copolymer of dimethylsiloxy, methylhydridosiloxy and trimethylsiloxy units having a viscosity of 300 mPa·s at 25° C. and an SiH content of 0.48% and 0.48 g of a solution containing a platinum-sym-divinyltetramethyldisiloxane complex which contains 1 wt % of platinum. This addition-crosslinking silicone composition was then crosslinked in a hydraulic press at a temperature of 165° C. in the course of 5 minutes to give a silicone elastomer film having a Shore A hardness of 43, an elongation at break of 660% and a tear strength of 11 N/mm².

Example 18

1.9 g of 2,5-bis-(tert-butylperoxo)-2,5-dimethylhexane were incorporated into 550 g of the silicone composition described in example 6 and this mixture was crosslinked at 165° C. in the course of 15 minutes to give a silicone elastomer film having a Shore A hardness of 40, an elongation at break of 550% and a tear strength of 10 N/mm².

Comparative Example C19 (Preparation of the Vinyldimethylsiloxy-terminated Polydimethylsiloxane used in Example 5) (Not According to the Invention)

A mixture which comprised 312 g of a linear hydroxydimethylsiloxy-terminated polydimethylsiloxane having a viscosity of 80 mm²/s at 25° C. and 16.2 g of a linear vinyldimethylsiloxy-terminated polydimethylsiloxane having a viscosity of 28 mm²/s at 25° C. and 10 weight ppm (based on the polydimethylsiloxane mixture) of phosphonitrile chloride in the form of a 0.5 percent strength by weight solution in methylene chloride was fed continuously per hour into a twin-screw kneader with a 140 cm long reaction zone kept at 140° C. and 6.7 hPa. 0.66 g per hour of 1,1-divinyl-1,1,3,3-tetramethyldisilazane were metered at 140° C. into the discharge tube of the polyorganosiloxane obtained by condensation and equilibration. After a storage period of 6 hours, a vinyldimethylsiloxy-terminated polydimethylsiloxane having a viscosity of 20,000 mPa·s and an OH content of 180 ppm by weight was obtained.

Example 20 (Preparation of the Vinyldimethylsiloxy-terminated Polydimethylsiloxane Used in Example 7)

In contrast to Comparative Example C19, the reaction temperature was increased to 170° C. and the amount of 1,1-divinyl-1,1,3,3-tetramethyldisilazane was raised to 2.1 g per hour. After a storage period of 12 hours, a vinyldimethylsiloxy-terminated polydimethylsiloxane having a viscosity of 20,000 mPa·s and an OH content of 5 weight ppm was obtained.

By way of example, the OH content can be determined with the aid of $^1$H-NMR spectroscopy, the SiOH groups being derivatized with suitable agents. The detection limit of this method is 0.2 weight ppm. Other methods well known to those skilled in the art can also be used to determine the SiOH content.

The silicone elastomer properties were characterized in accordance with DIN 53505 (Shore A) and DIN 53504-S1 (tear strength and elongation at break). The viscosity was determined at a shear rate of 0.9 s$^{-1}$.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A silicone composition comprising
   (A) 100 parts by weight of one or more organopolysiloxane(s) having an OH content, based on Si-bonded OH groups, of 1 to about 5 ppm, and
   (B) 1-200 parts by weight of one or more filler(s) having a specific surface area of at least 50 m²/g.

2. The composition of claim 1, wherein the organopolysiloxane(s) (A) contain on average per molecule, at least one radical having an aliphatic carbon-carbon multiple bond.

3. A silicone composition comprising
   (A) 100 parts by weight of one or more organopolysiloxane(s) having an OH content, based on Si-bonded OH groups, of 1 to 100 weight ppm, and
   (B) 1-200 parts by weight of one or more filler(s) having a specific surface area of at least 50 m²/g,
   wherein the organopolysiloxane(s) (A) contain on average per molecule, on average at least one Si-bonded hydrogen atom.

4. The silicone composition of claim 3, wherein the organopolysiloxane(s) (A) contain on average per molecule, at least one Si-bonded hydrogen atom and also contain per molecule on average at least one radical having an aliphatic carbon-carbon multiple bond.

5. The crosslinkable silicone composition of claim 2, which further comprises:
   (F) at least one hydrosilylation catalyst, and
   (H) at least one SiH crosslinking agent.

6. The crosslinkable silicone composition of claim 3, wherein the organopolysiloxane(s) (A) further comprise on average per molecule, more than one radical having an aliphatic carbon-carbon multiple bond, and said composition additionally comprises a (F) hydrosilylation catalyst.

7. The crosslinkable silicone composition of claim 4, which further comprises (F) a hydrosilylation catalyst.

8. A silicone composition comprising
   (A) 100 parts by weight of one or more organopolysiloxane(s) having an OH content, based on Si-bonded OH groups, of 1 to 100 ppm, and
   (B) 1-200 parts by weight of one or more filler(s) having a specific surface area of at least 50 m²/g,
   said composition additionally comprising (L), a peroxide, wherein the organopolysiloxane(s) (A) contain on average per molecule, at least one radical having an aliphatic carbon-carbon multiple bond.

9. The silicone composition of claim 1, wherein the filler is precipitated and/or pyrogenic silica, which is optionally a hydrophobized silica.

10. A shaped article produced by crosslinking the compositions of claim 5.

11. A shaped article produced by crosslinking the compositions of claim 6.

12. A shaped article produced by crosslinking the compositions of claim 7.

13. A shaped article produced by crosslinking the compositions of claim 8.

14. A shaped article produced by crosslinking the compositions of claim 9.

* * * * *